United States Patent
Chan et al.

(10) Patent No.: US 9,679,004 B2
(45) Date of Patent: Jun. 13, 2017

(54) PLANNED CLUSTER NODE MAINTENANCE WITH LOW IMPACT ON APPLICATION THROUGHPUT

(71) Applicant: Oracle International Corporation, Redwood Shores, CA (US)

(72) Inventors: Wilson Wai Shun Chan, San Mateo, CA (US); Tolga Yurek, Foster City, CA (US); Tak Fung Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 14/337,067

(22) Filed: Jul. 21, 2014

(65) Prior Publication Data
US 2016/0019253 A1    Jan. 21, 2016

(51) Int. Cl.
G06F 17/30    (2006.01)

(52) U.S. Cl.
CPC ............... *G06F 17/30362* (2013.01)

(58) Field of Classification Search
CPC ............ G06F 17/30362; G06F 17/30159
See application file for complete search history.

(56) References Cited

U.S. PATENT DOCUMENTS

| | | | |
|---|---|---|---|
| 7,340,743 B1 * | 3/2008 | Anural | G06F 9/526 707/999.008 |
| 7,370,223 B2 * | 5/2008 | Olmstead | G06F 11/2028 714/3 |
| 7,937,377 B2 * | 5/2011 | Wilding | G06F 17/30575 707/704 |

OTHER PUBLICATIONS

Christensen Elden, "Clustering and High-Availability", How to Properly Shutdown a Failover Cluster or a Node, internet, http://blogs.msdn.com/b/clustering/archive/, dated Aug. 23, 2013, 4 pages.

* cited by examiner

*Primary Examiner* — Cheryl Lewis
(74) *Attorney, Agent, or Firm* — Hickman Palermo Becker Bingham LLP; Daniel D. Ledesma

(57) ABSTRACT

Techniques for taking one or more nodes of a multi-node database system offline are provided. Initially, the multi-node database system uses a first data access management system (e.g., a distributed lock management system) to manage access to data stored in a database. In response to determining that one or more nodes need to be taken offline or otherwise become unavailable, the remaining nodes implement a second data access management system (e.g., an affinity-based access system) to manage access to data stored in the database. After the offline nodes are brought back online, all the nodes in the multi-node database system implement the first data access management system again. The transitions between the two data access management system may involve multiple phases that involve communicating different types of information between nodes that are taken offline and nodes that are not taken offline.

20 Claims, 8 Drawing Sheets

US 9,679,004 B2

PLANNED CLUSTER NODE MAINTENANCE WITH LOW IMPACT ON APPLICATION THROUGHPUT

FIELD OF THE DISCLOSURE

The present disclosure relates to bring down server instances in a database cluster in such a way as to eliminate or minimize downtime of the database system.

BACKGROUND

When applications run on a cluster environment, any node shut down or start up introduces a brownout that causes the application throughput to drop and response time to get worse. While unexpected failures can always bring nodes down, sometimes nodes need to be brought down manually at will in order to patch or upgrade software or hardware on the nodes.

Many mission critical applications require fault tolerance and consistent, uninterrupted high performance. Even a scheduled maintenance down time, which must be performed at certain intervals, is detrimental to application performance. If the length of down time is directly linked to loss of revenue, then scheduled maintenance down time can cause a significant financial loss. Minimizing the impact of such downtime (also referred to as "brownout") and bringing that impact down to a negligible level can help avoid loss of significant revenue in such systems.

Previous attempts to minimize the impact have included solutions that focus on fast application failover strategies. However, the rebuilding of resource mastership in a shared disk architecture where each cluster node is the master for a set of resources that need to be accessed by the applications has inherently introduced a brownout period that impacts application performance. Previous solutions have a brownout time which is directly proportional to the quantity of resources. Thus, the larger the system is memory-wise, the longer the brownout period.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
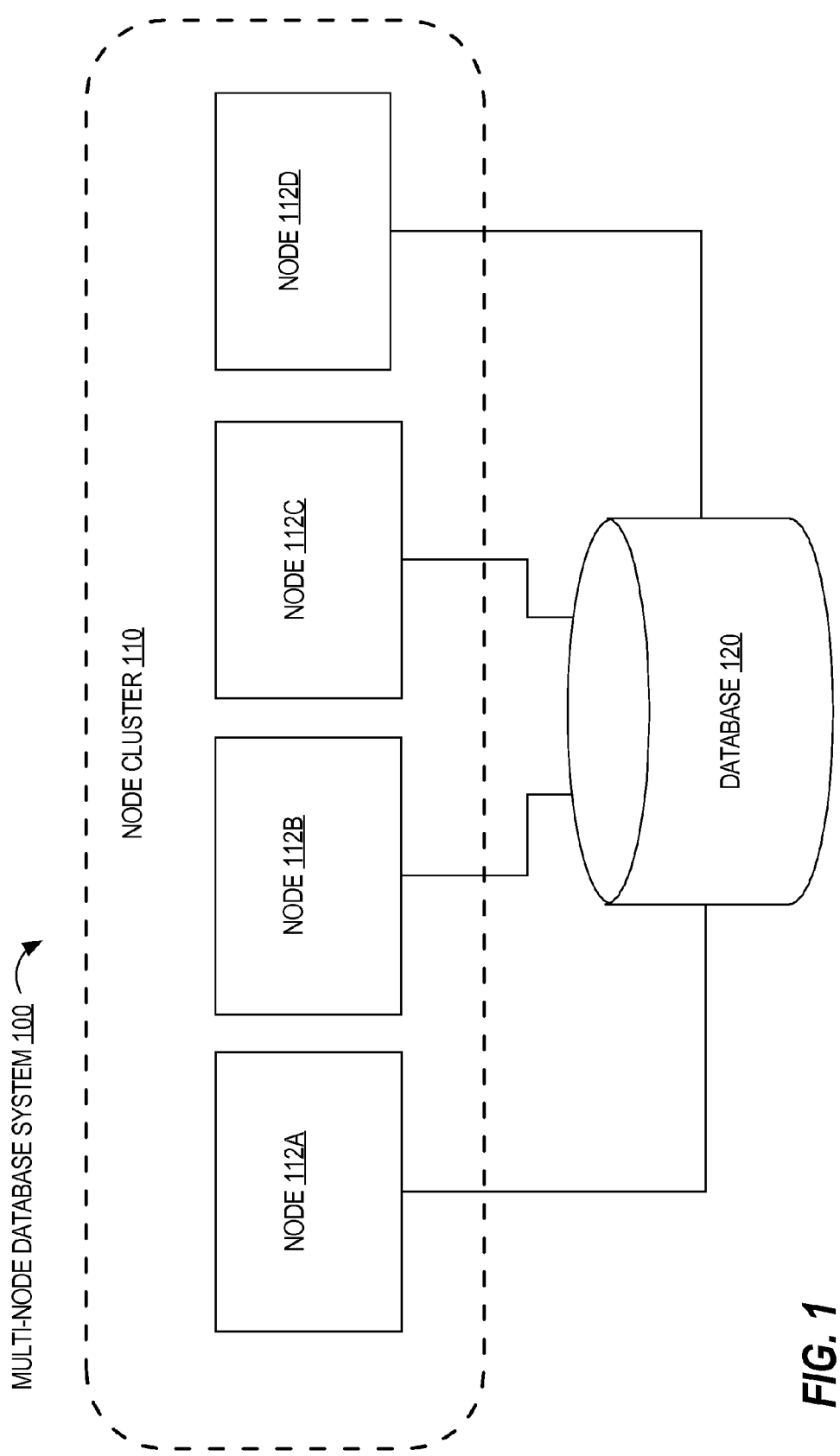
FIG. 1 is a block diagram that depicts an example multi-node database system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for changing the type of lock system that a multi-node database system implements when a brownout occurs. For example, the multi-node database system implements a distributed lock management system prior to a scheduled brownout. While one or more nodes of the database system are down for maintenance, the remaining nodes of the database system implement an affinity-based lock system where a resource can only be accessed by a single remaining node.

In techniques described herein, the amount of data managed by the multi-node database server has minimal impact (if any) on the effect of a brownout on application performance. This is possible because the need to rebuild resource mastership when a node is shut down and rejoins the cluster is almost completely eliminated. There are other resources that do not map to database objects to which techniques described herein apply. However, the number of such resources is small enough that rebuilding mastership of those resources does not significantly impact the benefit of techniques described herein. An example of such a resource is an enqueue, which is another type of concurrency control mechanism, but does not map to database objects or buffers. There are also some other specialized database objects, such as undo tablespaces, which are specific to a cluster node regardless of client connections and services provided by the database system. Such specialized database objects require rebuilding mastership. However, again, the number of such specialized database objects is small enough that rebuilding mastership of corresponding resources does not significantly impact the benefit of techniques described herein.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL")

instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

System Overview

FIG. 1 is a block diagram that depicts an example multi-node database system 100, in an embodiment. Multi-node database system 100 includes a node cluster 110 and a database 120 that stores data that is accessible to each node in node cluster 110. Node cluster 110 includes four nodes: nodes 112A-112D. Although four nodes are depicted, node cluster 110 may include more or less nodes.

Each node 112 runs or executes one or more instances of a database server (or "server instance"). Each server instance is configured to receive client requests to store data to, retrieve data from, and/or process data from database 120. Each server instance may be implemented in hardware, software, or a combination of hardware and software. For example, each node 112 includes one or more processors and memory that stores instructions which, when executed by the one or more processors, implement the functionality of a server instance.

Database 120 may be implemented on any storage mechanism, such as one or more magnetic disks.

Although not depicted in FIG. 1, clients connect to nodes in node cluster 110 and send queries that server instances process in order to access any part of database 120 through any node. Each node 112 may cache a portion of database 120 in its system memory in the form of a buffer cache. Each buffer is represented by a data structure referred to herein as a "resource." Each resource may be mastered by one of nodes 112A-112D, where the master of the resource coordinates concurrent access to the region of the database cached in the buffer cache and represented by the resource.

Each node 112 provides (or enables) one or more services and a service may be provided by multiple nodes in node cluster 120. Clients connect to a particular service on one of the nodes that provides the particular service. Each service accesses a set of database objects (read into buffer cache from disk). Multiple services may access the same database object.

Examples of database objects include tables and indexes. Each database object is assigned a unique database object identifier.

A buffer is the basic unit of data which is cached in a memory of node 112. A buffer maps to a part of database 120. Depending on the size of the buffer and the size of table columns, a buffer might contain entire columns of a table or a fraction of a column.

A resource, on the other hand, is a data structure that represents a buffer; thus, there is a one-to-one mapping between buffers and resources. Locks (of a resource) opened by nodes 112 hang under the resource at the master of the resource.

Data Access Management Systems

A database system typically implements a single data access management system. Examples include a distributed lock management system and an affinity-based access system.

In a distributed lock management system, each server instance in a multi-node database system (e.g., system 100) implements a lock manager. The lock managers communicate with each other to provide concurrency control to data stored in the database (e.g., database 120). Each server instance is assigned to be a "master" of a set of resources that represent data stored in the database. Thus, concurrency control is implemented across multiple nodes of a node cluster instead of on a single node.

A "master" of a resource enforces concurrency control over the resource such that, for example, no two server instances concurrently modify the same data item (e.g., row or value) or one server instance does not read a data item that is being modified by another server instance. The master grants a lock on the resource to a requesting server instance ("requestor"). While the requestor holds the lock, the master may receive requests for locks on the resource from other requesting instances. Depending on the types of locks requested, the other requesting instances may have to wait until the requestor releases its lock on the resource before the master grants a lock to any of the other requesting instances.

In an affinity-based access system, a resource can only be accessed by a single node or server instance. Thus, a second server instance does not ask a first server instance for a resource with which the first server instance has an affinity. Instead, all client requests that affect the resource (e.g., reads and writes) are directed to the first server instance. Because only a single server instance can access any particular resource, concurrency control is not an issue in affinity-based access systems.

In an embodiment, multi-node database system 100 implements a distributed lock management system before and after multi-node database system 100 (or a subset of node cluster 110) implements an affinity-based access system. A trigger for implementing the affinity-based access system may be scheduled maintenance for one or more nodes in node cluster 110.

General Example Process

Figure 2:
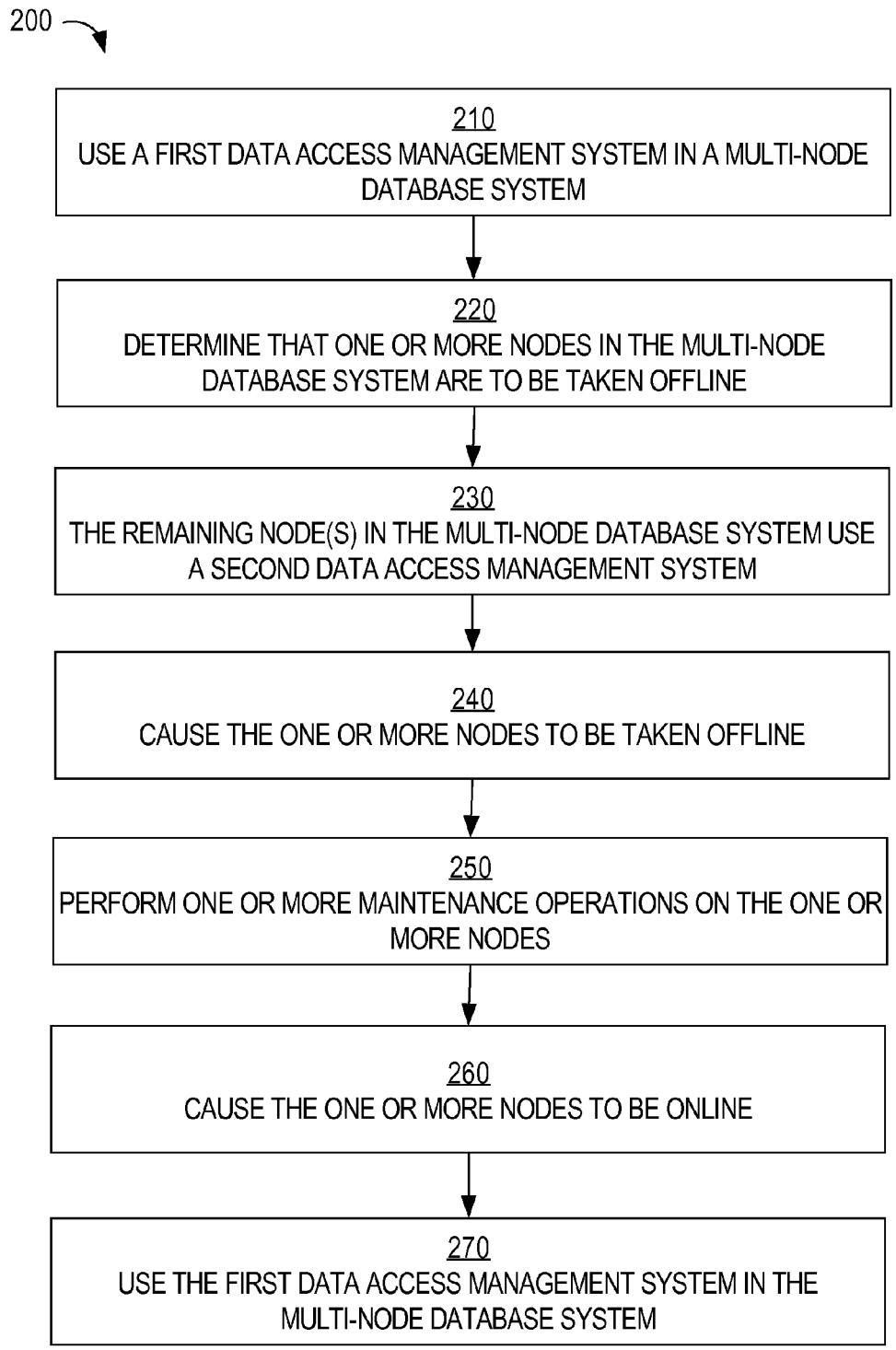
FIG. 2 is a flow diagram that depicts a process for switching data access management systems in response to a temporary take down of one or more nodes in a multi-node database system, in an embodiment.
Figure 3A:
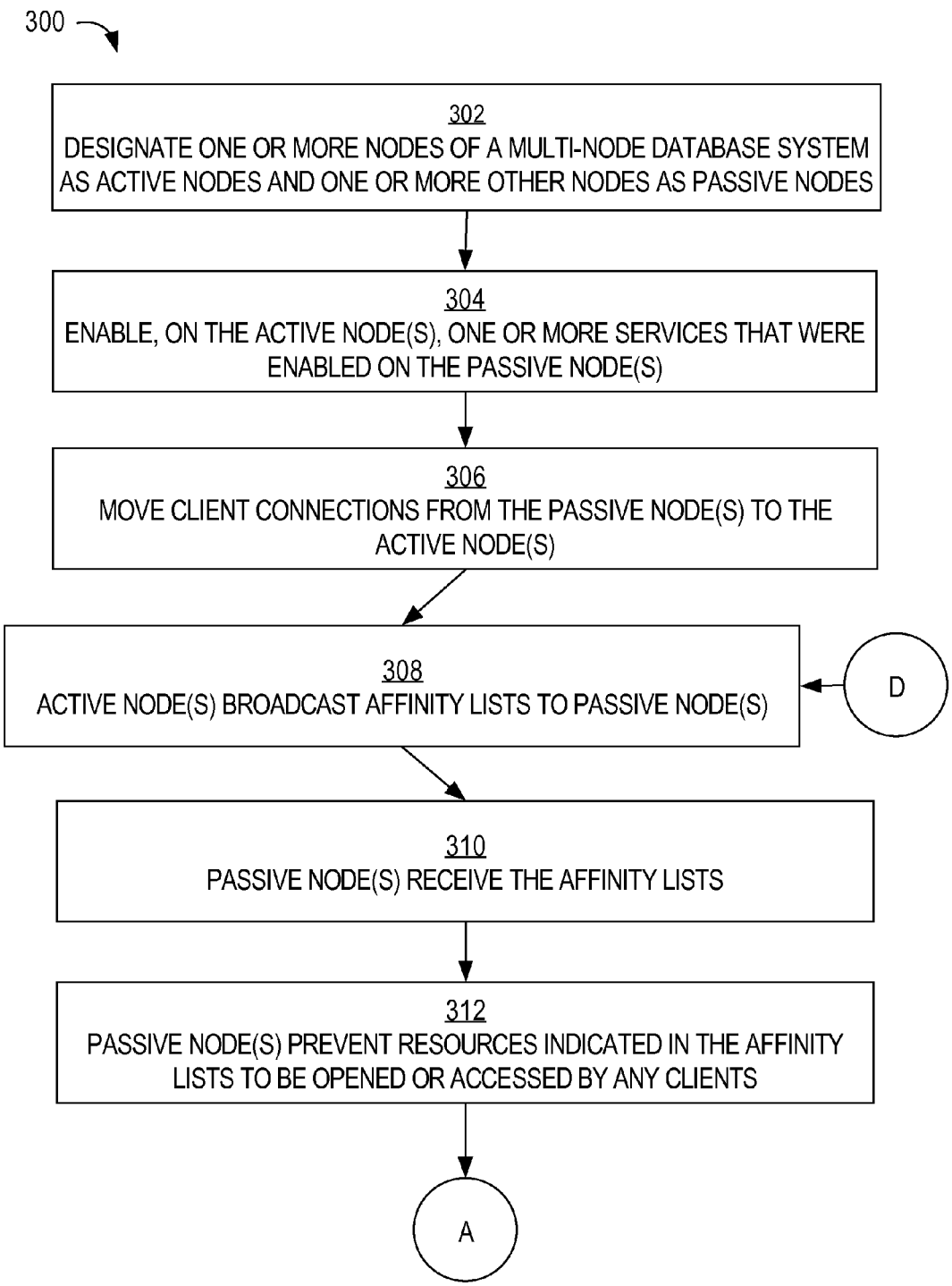
FIGS. 3A-3E are flow diagrams that depict a process for taking one or more nodes of a node cluster offline, in an embodiment.
Figure 3B:
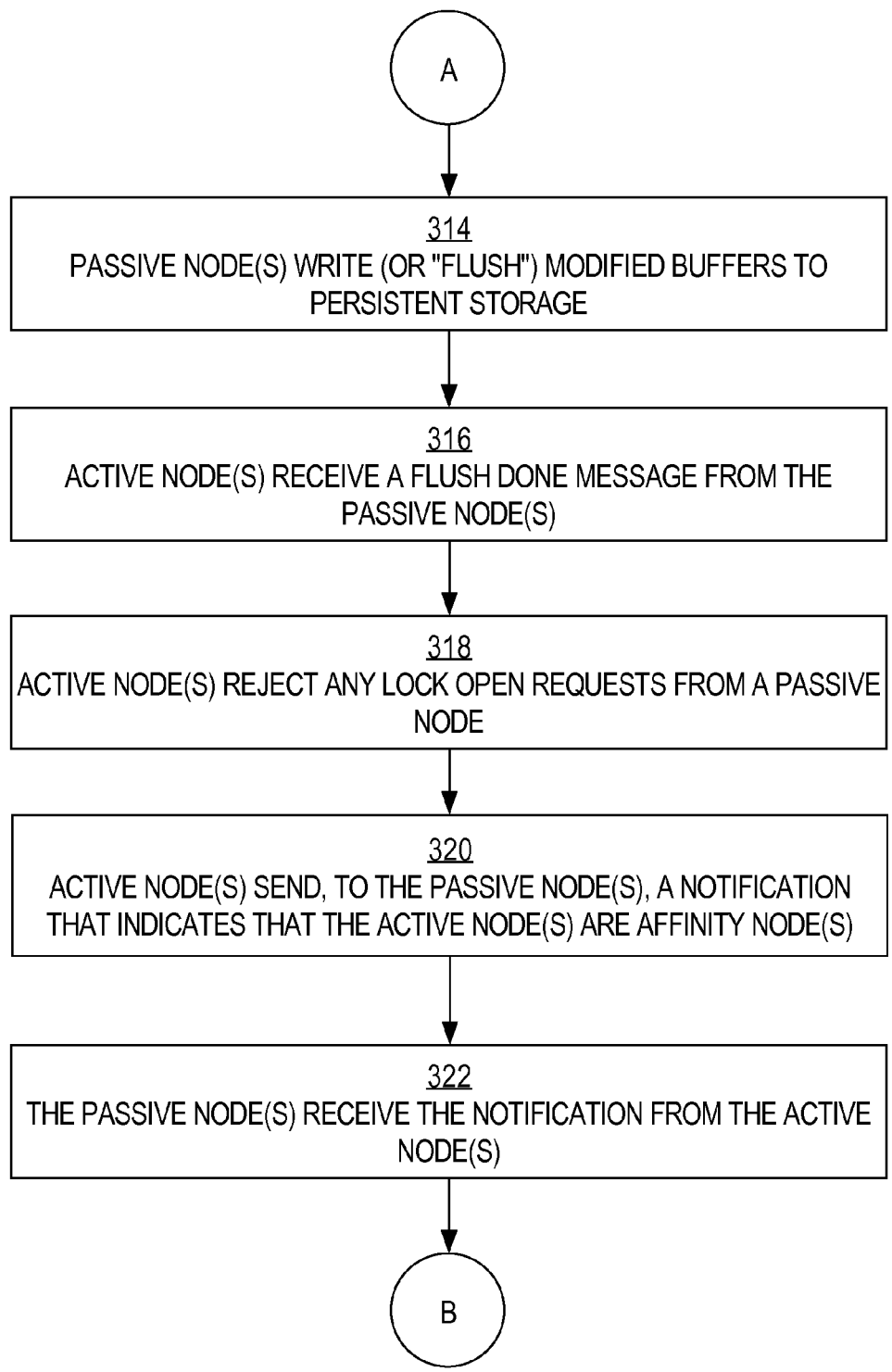
Figure 3C:
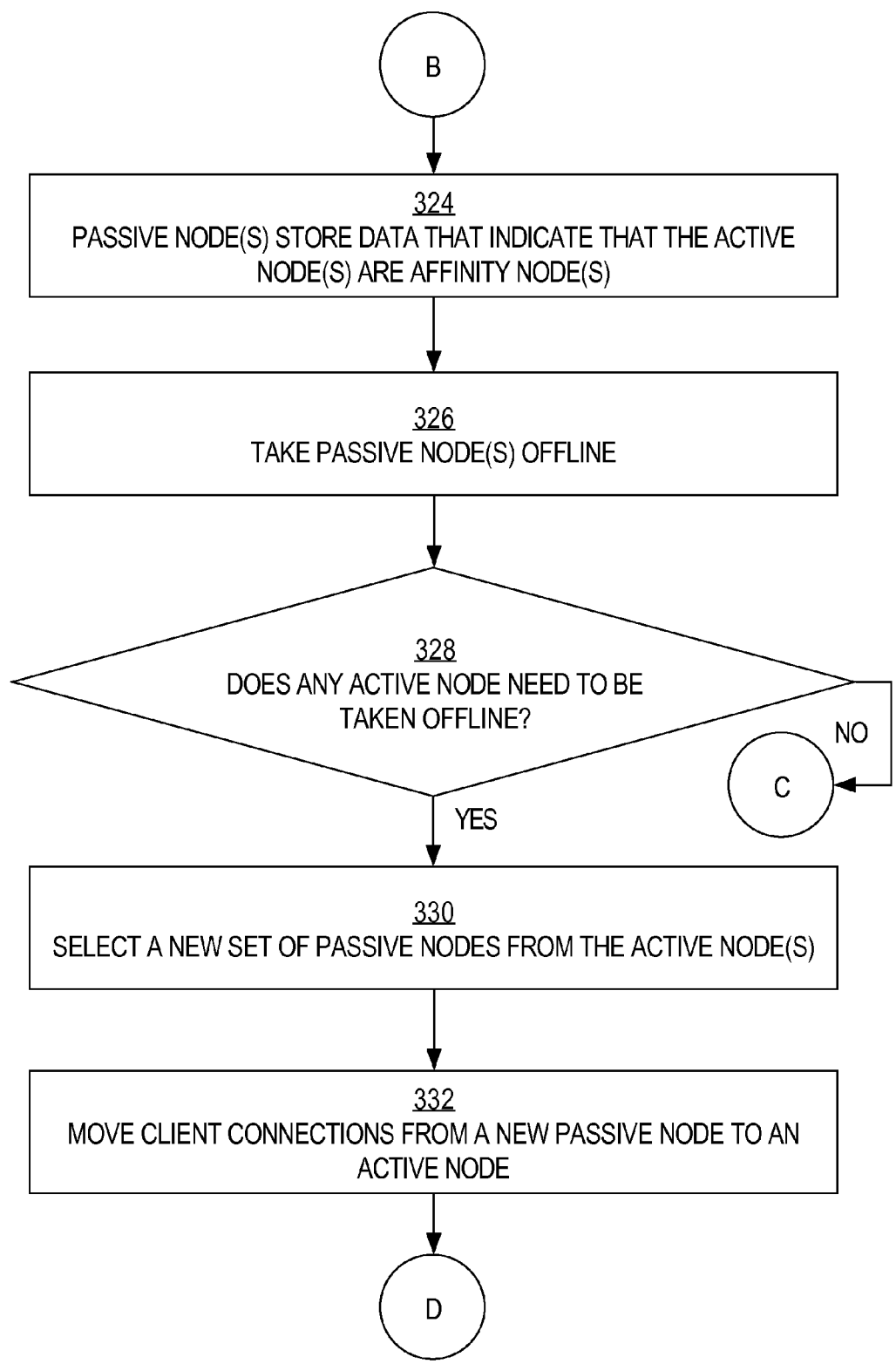
Figure 3D:
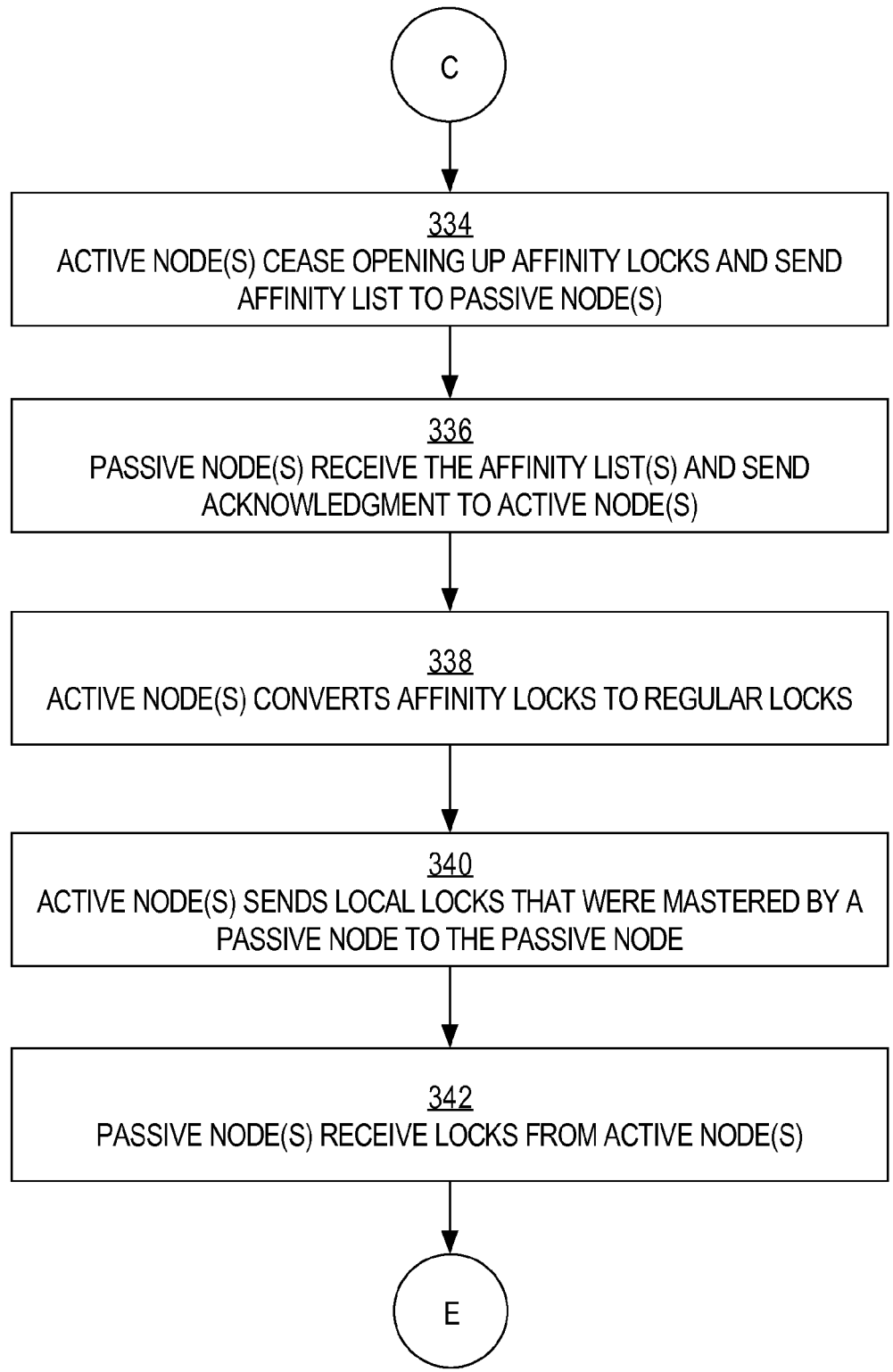
Figure 3E:
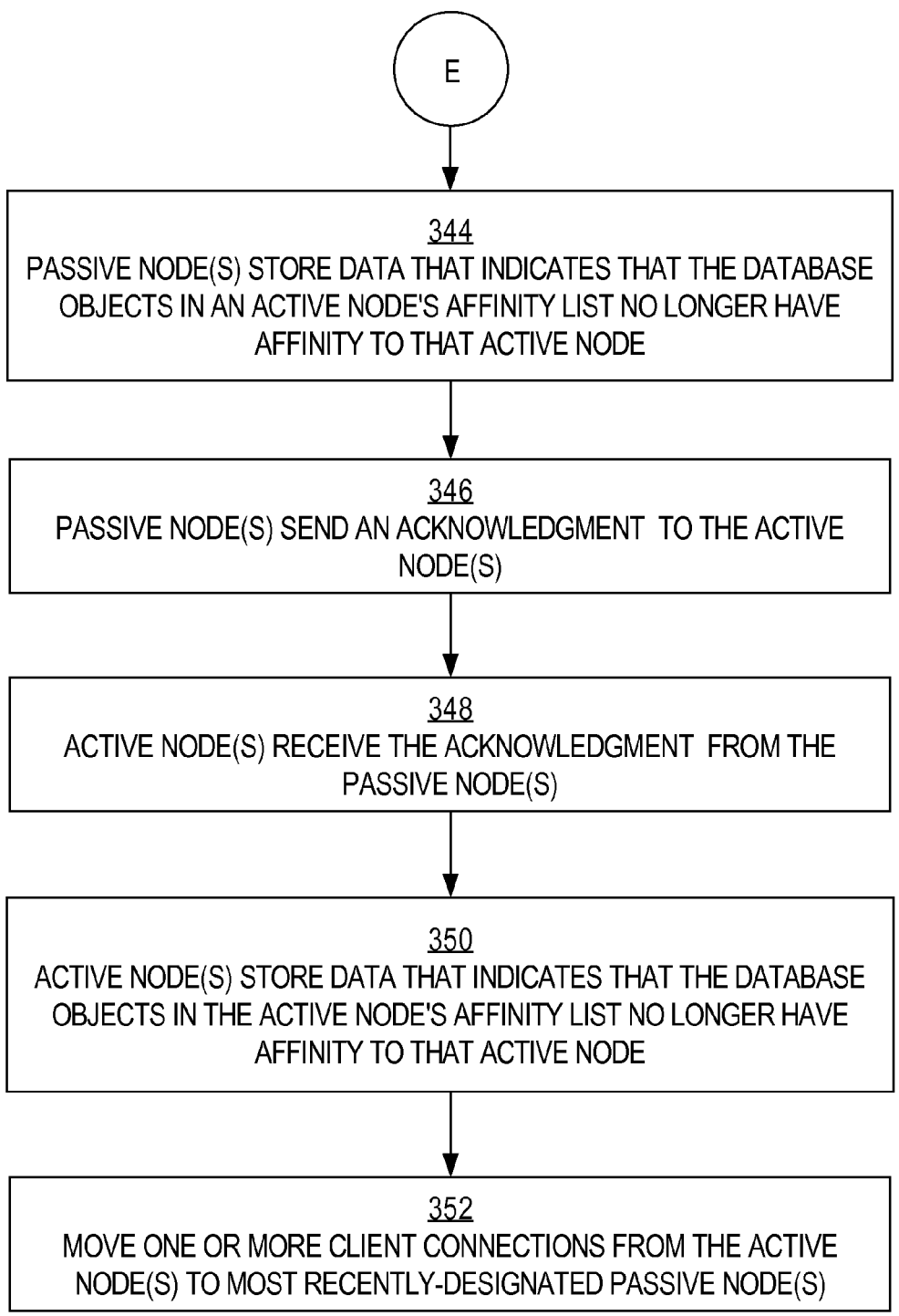

FIG. 2 is a flow diagram that depicts a process 200 for switching data access management systems in response to a temporary take down of one or more nodes in a multi-node database system, in an embodiment.

At block 210, multi-node database system 100 uses a first data access management system to manage access to data stored in database 120. For example, the first data access management system is a distributed lock management system that is implemented across nodes 112A-112D in node cluster 110.

At block 220, it is determined that one or more nodes of multi-node database system 100 will be taken offline. One reason for making one or more nodes unavailable is to perform scheduled maintenance on the one or more nodes, where such maintenance does not allow for the concurrent handling of client requests.

At block 230, the remaining nodes of multi-node database system 100 uses a second data access management system to manage access to data stored in database 120. For example, the second data access management system is an affinity-based access system. For example, while nodes 112A-112B are taken offline, nodes 112C-112D implement an affinity-based access system.

Block 230 may involve assigning each of the services provided collectively by node cluster 110 to one of node 112C or node 112D. The database objects associated with each service will only be accessible to either node 112C or node 112D, but not both. Afterward, client requests for one of those services will be directed to either node 112C or node 112D. Client requests will be directed to the appropriate node even before the affinity-based system is fully established on nodes 112C and 112D.

At block 240, the one or more nodes are taken offline.

At block 250, one or more maintenance operations are performed on the offline node(s). The maintenance operations may require the node(s) to be restarted. Alternatively, the maintenance operations may require that certain processes cease executing and certain software to be installed without shutting down the server instance(s) on the node(s).

At block 260, the offline node(s) are brought back online.

At block 270, multi-node database system 100 implements the first data access management system. For example, if database system 100 implemented an affinity-based access system during block 250, then database system 100 again implements the distributed lock management system in block 270.

In an embodiment, process 200 includes multiple iterations of nodes being taken offline and the remaining nodes using the second data access management system to manage access to the data before block 270 is performed. For example, nodes 112A-112C are taken offline while node 112D implements the second data access management system. Then, after nodes 112A-112C are back online, node 112D is taken offline while nodes 112A-112C (or, for example, only node 112A) implement the second data access management system. In other words, while a node is being taken offline or being brought back online, all other online nodes implement the second data access management system. Then, all nodes 112 in node cluster 110 are brought back online and each node in cluster 110 implements the first data access management system.

Detailed Example Process

FIGS. 3A-3E are flow diagrams that depicts a process 300 for taking one or more nodes of a node cluster offline, in an embodiment. Process 300 is performed in multiple phases described in detail below: a passive identification phase, a flush phase, a conversion phase, a shutdown phase, a repeat phase, an affinity dissolve phase, a replay phase, and a rebalance phase.

Passive Identification Phase

At block 302, one or more nodes in node cluster 110 are designated as "active" nodes and one or more other nodes in node cluster 110 are designated as "passive" nodes. The passive nodes will be taken offline such that each passive node has no workload and does not support any client connections. Initially, all nodes in node cluster 110 are considered active nodes.

Block 302 may be performed in response to a determination (e.g., by each of nodes in node cluster 110) that one or more nodes in node cluster 110 are to be taken offline.

At block 304, each service that was enabled on a passive node is enabled on (or transferred to) only one of the active nodes. For example, if node 112A is the only node that enables service 1, then, if node 112A becomes a passive node, then block 304 involves enabling service 1 on one of nodes 112B-112D. As another example, if both nodes 112A and 112B enables service 2, then if node 112A becomes a passive node, then block 304 involves disabling service 2 on node 112A, resulting in service 2 being enabled only on node 112B. In other words, a service may be enabled on multiple nodes; but once the active and passive nodes are defined, each service becomes enabled on only a single active node.

Block 304 may be skipped if each service that is enabled on a passive node is enabled on only a single active node. For example, nodes 112A and 112B enable service 1 and nodes 112C and 112D enable service 2 and nodes 112A and 112C are designated as passive nodes, then block 304 may be skipped, since service 1 is enabled on only active node 112B and service 2 is enabled on only active node 112D.

Block 304 may also involve determining whether multiple services can access the same data in database 120. If so, the multiple services are enabled on a single active node. This ensures that each active node has exclusive access to any particular data item (e.g., table, partition, or column).

This service assignment of block 304 may take into account the past and/or expected workload for each service. For example, if the size of the workload associated with service 1 is similar to the size of the workload associated with services 2-4, then service 1 is assigned to one active node while services 2-4 are assigned to another active node. The service assignment of block 304 is effectively a data item assignment since each service typically accesses an exclusive set of data.

At block 306, client connections from each passive node are "moved" to an active node depending on the service assignment of block 304. For example, if a client connection on a passive node is for service 2 and service 2 was assigned to an active node at block 304, then the client connection is moved to that active node. "Moving" a client connection may involve closing the client connection and reestablishing the client connection on the active node or sending a copy of the state of the client connection from the passive node to the active node and causing the corresponding client to interact with the active node instead of the passive node.

At block 308, an active node begins broadcasting affinity data to passive nodes and other active nodes (if there are any). Affinity data identifies database objects to which the active node is assigned. An active node is "active" only with respect to the database objects assigned to the active node. The active node behaves as a passive node for all other database objects, except that the active node is not shut down for maintenance while the active node is active for at least one database object.

The active node also waits to receive "flush done" messages from all passive nodes, described in more detail below. A "flush done" message from a passive node indicates that the passive node has written, to persistent storage, any changes that the passive node has made to data objects with which the active node has an affinity.

At block 310, the passive nodes receive affinity data from the active node.

At block 312, in response to receiving affinity data, passive nodes prevent any resources that belong to a received affinity list to be opened or accessed by clients of the database system. A client request for a service may have been (1) submitted before the service assignment change of block 304 was made public but (2) received by a passive node after the passive node received affinity data from an active node. While all client connections to passive nodes have been moved prior block 312, the corresponding communication channels may not have been flushed. Thus, a client message sent before the connections were moved may arrive at a passive node after the connections are moved.

Flush Phase

At block 314, the passive nodes initiate a flush phase, which involves the passive nodes flushing out all buffers, from their respective buffer caches, that belong to the affinity list. "Flushing" involves writing out "dirty" or modified buffers to persistent storage, closing out resource structures that represent the buffers, and sending out close lock messages to master nodes that master resources that are being closed.

At the end of the flush phase, each passive node's buffer cache is empty of any buffers that belong to database objects in a received affinity list. Also, each passive node sends out a "flush done" message to the active node from which an affinity list was received.

At block 316, an active node receives a flush done message from each passive node to which the active node sent an affinity list.

At block 318, an active node that has received all of its flush done messages begins its own flush phase. At this phase, all the close lock messages sent out to the active node (because the active node happened to be the resource master for the database objects with which the active node has affinity) are guaranteed to have been received before the flush done messages. Thus, the active node is in a state where there are no locks open that belong to the passive nodes.

The flush phase involves rejecting any lock open request from passive nodes from this point on. The active node switches to the role of becoming the resource master for all resources belonging to database objects in the active node's affinity list.

Conversion Phase

The flush phase also involves a conversion phase where the active node (1) removes its own local locks that map to buffers that belong to the database objects in the active node's affinity list and (2) represents its own local locks with, for example, a special bit in the actual buffer that resides in the active node's buffer cache. Such a non-lock is referred to herein as an "affinity lock." The active node may remove all resource structures because there are no locks on resources of database objects indicated in the active affinity list. Any new locks on resources in the affinity list of the active node are opened as affinity locks.

Additionally, subsequent client connections with the active node are made according to the service(s) that the active node enables. For example, if service A was assigned to node 112A, then client requests for service A are handled by node 112A. Managing such client connections may involve the active node opening and modifying affinity locks which will not be blocked by locks held by other nodes, since there will be no locks held by other nodes at this point. As a result, zero application impact is achieved.

At the end of an active node's flush phase, the active node does not have any lock structures and all of its own "locks" are affinity locks.

At block 320, an active node broadcasts an "active affinity done" message to all passive nodes (and other active nodes, if any) and stores data that indicates completion of the conversion of the active node to an affinity node. Such data may be stored in association with each reference to a database object in the active node's affinity list. For example, an affinity list of an active node may be reflected in an affinity table, which includes a status field or column. The status field may comprise a single bit that indicates whether affinity has been completed for the corresponding database object.

At block 322, each passive node receives an "active affinity done" message from an active node.

At block 324, in response to receiving the "active affinity done" message from an active node, the passive node also stores data that indicates completion of the conversion of the active node to an affinity node. Again, such data may be stored in association with each reference to a database object in the affinity list of the active node.

If there are multiple active nodes, then active affinity may be performed serially, i.e., one active node at a time. Thus, after one active node broadcasts an affinity done message to each other node (whether passive or active) and receives an acknowledgment back from each other node, the next active node begins its own affinity, involving blocks 308 to 324.

Shutdown Phase

At block 326, after all active nodes indicate that affinity conversion has completed, the passive nodes are taken offline, which may entail shutting the passive nodes down, upgrading (or downgrading) any installed hardware or software, and starting the passive nodes. This is referred to as a "reconfiguration event." A reconfiguration event occurs when a cluster node is taken offline or comes back online to rebuild resource mastership. In embodiments described herein, each reconfiguration event has minimal (close to zero) impact because rebuilding of mastership is unnecessary. Every active node is the master for all resources in its own affinity list. Also, there are very few resources and locks to scan when searching to find the few that belong to the database objects that are not in the affinity list. On each active node, the majority of the buffer cache is expected to be made up of buffers that belong to the database objects that are in the active affinity list of that active node. There may be, for example, undo buffers that belong to an undo tablespace.

Repeat Phase

At block 328, it is determined whether any active node needs to be taken offline. The first time this determination is performed, the active nodes are the only nodes that have not yet been taken offline. In an embodiment, the originally-designated passive nodes are the only nodes that need to be patched. In this embodiment, process 300 proceeds to block 334. However, in an embodiment where the active nodes also need to be taken offline, process 300 proceeds to block 330.

At block 330, a new set of passive nodes is selected from the active node(s). For example, if nodes 112A and 112B were active nodes and nodes 112C and 112D were passive nodes, then nodes 112A and 112B may be designated as passive nodes and nodes 112C and 112D may be designated as active nodes. As another example, if node 112A was the only active node and nodes 112B-112D were passive nodes, then node 112A may be designated as passive and one or more of nodes 112B-112D may be designated as active. For example, only node 112B may be designated as active while node 112A is passive. After node 112A is back online, all nodes in cluster 110 would then convert to a distributed lock management system.

At block 332, (assuming that a new set of one or more passive nodes are designated), all client connections with an "old" active node are moved to one or more new active nodes. Process 300 then proceeds to block 308, wherein blocks 308-328 are repeated, even the flush and conversion phases. As soon as client connections are moved to a new active node, the new active node begins opening regular locks until the flush phase begins.

Affinity Dissolve Phase

At block 334, (after it is determined that no more nodes need to be taken offline), an "affinity dissolve" phase is begun. The affinity dissolve phase involves each active node ceasing to open up affinity locks. Instead, each active node opens "regular" locks, i.e., locks according to distributed lock management.

The affinity dissolve phase also involves the active nodes broadcasting an affinity dissolve list to each passive node and the other active nodes, if any. Other active actives are "active" with respect to their own affinity lists and "passive" with respect to each other's affinity lists. The affinity dissolve list from an active node identifies a set of database objects to which the active node has an affinity and any affinity locks on database objects in the set.

At block 336, each passive node receives an affinity list from an active node, stores data that indicates that the database objects identified in the affinity list are undergoing a dissolve procedure, and sends an acknowledgement message back to each active node from which the passive node received an affinity list. A passive node needs to know the affinity list of active nodes because the passive node may (soon) be mastering locks on one or more database objects. An active node that has already opened locks on such database objects will replay their locks to a passive node that just came back online if the passive node is assigned mastership due to the distributed lock management protocol.

At block 338, after each active node receives an acknowledgment message from each passive node to which the active node sent an affinity dissolve list, the active node expands (or converts) its affinity locks to regular locks. In other words, a resource and regular lock are opened for each buffer that was previously marked as having an affinity lock. At this time, each active node is the master for all resources in its affinity list.

In an embodiment, if there is more than one active node, then the affinity dissolve phase is performed for each active node in a serially fashion, such that one active node completes the affinity dissolve phase before another active node begins the affinity dissolve phase.

During the affinity dissolve phase, all client connections are still with the active nodes and each active node is still acting as though an affinity-based data access management is still implemented. Client connections at an affinity node continue until after the dissolve phase is completed. Affinity locks are gradually dissolved, lock by lock. Affinity with respect to a database object exists until a corresponding lock is replayed (as described below). Affinity with respect to the database object ceases once the lock is replayed.

Replay Phase

At block 340, each active node begins a "replay" phase. In this phase, an active node replays (or sends) its local locks on resources that were mastered by passive nodes (previous to the reconfiguration event(s)) to their respective passive masters. Each replay indicates the switching of the resource master from the active node to the master passive node for that resource that is being replayed. At the end of the replay phase, each active node sends a "dissolve done" message to each other node (whether active or passive) since the list of database objects on which affinity was to be dissolved was sent to each node in the beginning. Thus, each passive node will receive and process a replay message prior to receiving and processing a dissolve done message.

If an active node does not have any active locks for a passive node, then the active node will not send any replay messages to that passive node. However, the active node may still send a dissolve done message to that passive node.

At block 342, each passive node receives replay messages from one or more active nodes and a dissolve done message. If there are no active locks on resources mastered by a passive node, then that passive node will not receive any replay messages.

At block 344, in response to receiving a dissolve done message from an active node, a passive node stores data that indicates that each database object indicated in that active node's affinity list no longer has an affinity to that active node.

At block 346, each passive node sends an acknowledgment message to each active node that sent the passive node a dissolve done message.

At block 348, each active node receives the acknowledgment message from one or more passive nodes. For example, if node 112A is an active node and nodes 112B-112D are passive nodes, then node 112A receives an acknowledgment message from each of nodes 112B-112D.

At block 350, in response to each active node receiving an acknowledgment message from one or more passive nodes, the active node stores data that indicates that each database object indicated in the active node's affinity list no longer has an affinity to that active node.

After block 350, the mastership is completely rebuilt where all nodes in the node cluster are resource masters over a different subset of resources.

If there are multiple active nodes, then the affinity dissolve and replay phases may be performed serially, i.e., one active node at a time. Thus, after one active node receives an acknowledgement from one or more passive nodes, the next active node begins its own affinity dissolve phase and replay phase, involving blocks 334 to 350.

Rebalance Phase

At block 352, one or more client connections are redistributed to the most recently-designated passive nodes, effectively making every node an active node. Because each node in the node cluster is able to access any resource, client connections may be with any node in the node cluster, regardless of whether the node is the master for the resource(s) that a client may be requesting. Thus, if node 112D was the only active node and was, therefore, handling all client connections with database system 100, then one quarter of the current client connections may be assigned to node 112A, a different quarter of the current client connections may be assigned to node 112B, and a different quarter of the current client connections may be assigned to node 112C. At this point, the multi-node database system has returned to its initial state prior to the initiation of process 300.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
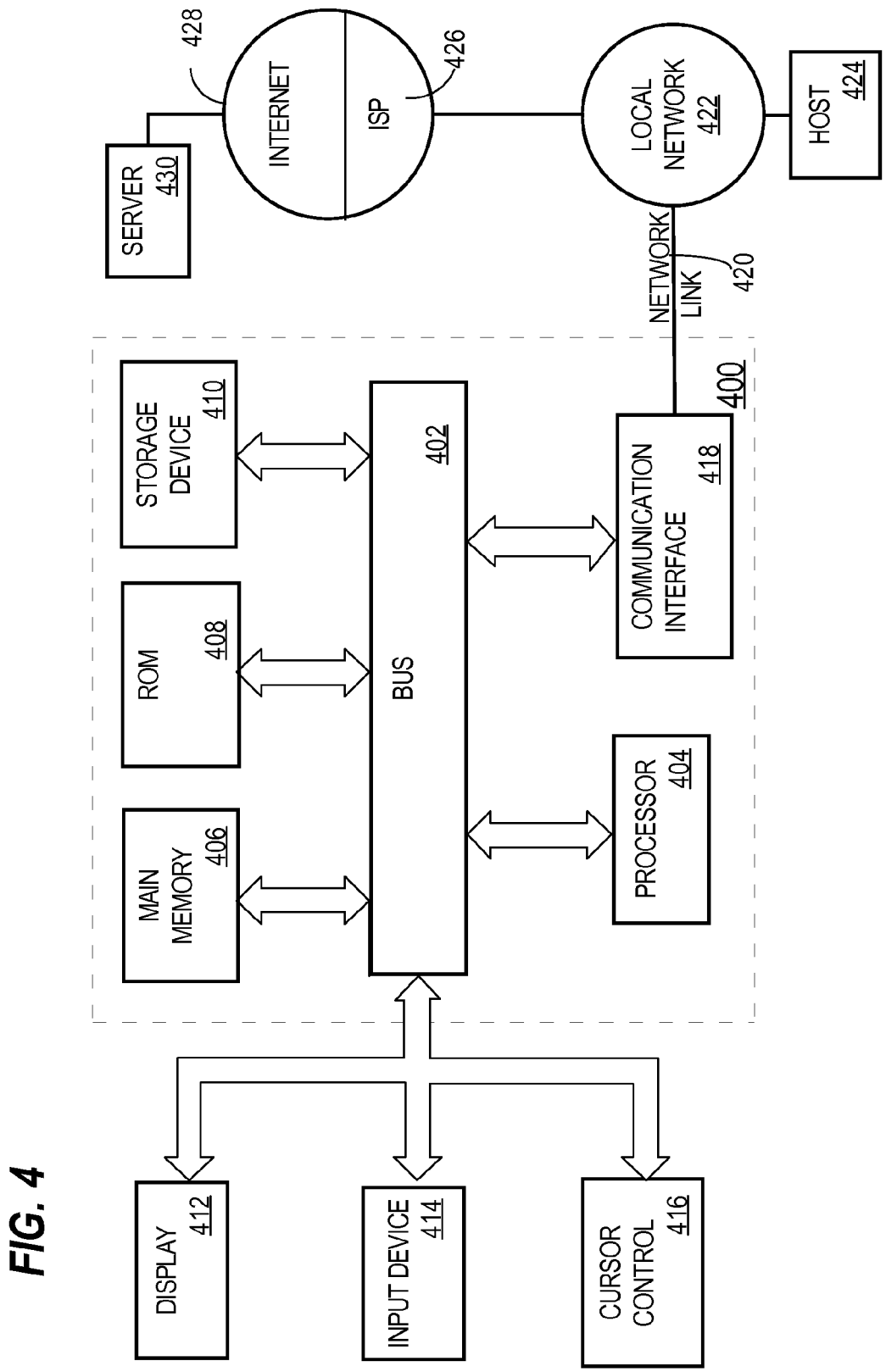
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using a first data access management system in a node cluster that comprises a plurality of nodes, each of which has access to a database;
   wherein the plurality of nodes includes a first set of one or more nodes and a second set of one or more nodes that is different than the first set of one or more nodes;
   while using the first data access management system, determining that each node in the first set of one or more nodes is to be taken offline;
   in response to determining that each node in the first set of one or more nodes is to be taken offline:
      using, in the second set of one or more nodes, a second data access management system that is different than the first data access management system to control access to data that is stored in the database;
      performing one or more maintenance operations on each node in the first set of one or more nodes;
   after determining that each node in the first set of one or more nodes is to be taken offline and prior to performing the one or more maintenance operations:
      for each node in the second set of one or more nodes, converting one or more locks that said each node maintains from a first type to a second type that is different than the first type, wherein the second type is an affinity lock;
   after performing the one or more maintenance operations, using the first data access management system in the node cluster;
   wherein the first data access management system is a distributed lock management system and the second data access management system is an affinity-based access system;
   wherein the method is performed by one or more computing devices.

2. The method of claim 1, wherein the second set of one or more nodes comprises multiple nodes, wherein the node cluster provides a plurality of services, the method further comprising, in response to determining that each node in the first set of one or more nodes is to be taken offline:
   determining that a first service of the plurality of services is to be provided by a first node of the multiple nodes;
   determining that a second service of the plurality of services is to be provided by a second node, of the multiple nodes, that is different than the first node.

3. The method of claim 1, further comprising, in response to determining that each node in the first set of one or more nodes is to be taken offline:
   moving one or more client connections from a node in the first set of one or more nodes to a node in the second set of one or more nodes.

4. The method of claim 1, further comprising, after determining that each node in the first set of one or more nodes is to be taken offline and prior to performing the one or more maintenance operations:
   sending, from a second node in the second set of one or more nodes, to a first node in the first set of one or more nodes, affinity data that identifies one or more database objects to which the second node is assigned;
   in response to receiving the affinity data, preventing, at the first node, locks from being opened on any of the one or more database objects.

5. The method of claim 1, further comprising, after determining that each node in the first set of one or more nodes is to be taken offline and prior to performing the one or more maintenance operations:
   for each node in the first set of one or more nodes:
      causing modified buffers to be written to persistent storage, and
      sending, to each node in the second set of one or more nodes, a notification that the modified buffers have been persistently stored.

6. The method of claim 1, further comprising, after determining that each node in the first set of one or more nodes is to be taken offline and prior to performing the one or more maintenance operations:
   receiving, from a first node in the first set of one or more nodes, at a second node in the second set of one or more nodes, a lock request;
   in response to receiving the lock request at the second node, determining, at the second node, to deny the lock request.

7. The method of claim 1, further comprising, after performing the one or more maintenance operations on each node in the first set of one or more nodes and prior to using the first data access management system in the node cluster:
   identifying a third set of one or more nodes from the second set of one or more nodes;
   performing the one or more maintenance operations on each node in the third set of one or more nodes.

8. The method of claim 1, further comprising:
   in response to determining that each node in the first set of one or more nodes is to be taken offline:
      designating each node in the first set of one or more nodes as a passive node, and designating each node in the second set of one or more nodes as an active node;
after performing the one or more maintenance operations:
for each node that is designated as an active node, converting one or more locks that are maintained by said each node from the second type to the first type.

9. The method of claim 1, further comprising:
in response to determining that each node in the first set of one or more nodes is to be taken offline:
designating each node in the first set of one or more nodes as a passive node, and
designating each node in the second set of one or more nodes as an active node;
after performing the one or more maintenance operations:
for each node that is designated as an active node, sending one or more locks from said each node to a node that is designated as a passive node.

10. The method of claim 1, further comprising:
in response to determining that each node in the first set of one or more nodes is to be taken offline:
designating each node in the first set of one or more nodes as a passive node, and
designating each node in the second set of one or more nodes as an active node;
after performing the one or more maintenance operations:
for each of one or more nodes that is designated as an active node, moving one or more client connections to a node that was most recently designated as a passive node upon which the one or more operations were performed.

11. One or more non-transitory storage media storing instructions which, when executed by one or more processors, cause:
using a first data access management system in a node cluster that comprises a plurality of nodes, each of which has access to a database;
wherein the plurality of nodes includes a first set of one or more nodes and a second set of one or more nodes that is different than the first set of one or more nodes;
while using the first data access management system, determining that each node in the first set of one or more nodes is to be taken offline;
in response to determining that each node in the first set of one or more nodes is to be taken offline:
using, in the second set of one or more nodes, a second data access management system that is different than the first data access management system to control access to data that is stored in the database;
performing one or more maintenance operations on each node in the first set of one or more nodes;
after determining that each node in the first set of one or more nodes is to be taken offline and prior to performing the one or more maintenance operations:
for each node in the second set of one or more nodes, converting one or more locks that said each node maintains from a first type to a second type that is different than the first type, wherein the second type is an affinity lock;
after performing the one or more maintenance operations, using the first data access management system in the node cluster;
wherein the first data access management system is a distributed lock management system and the second data access management system is an affinity-based access system.

12. The one or more non-transitory storage media of claim 11, wherein the second set of one or more nodes comprises multiple nodes, wherein the node cluster provides a plurality of services, wherein the instructions, when executed by the one or more processors, further cause, in response to determining that each node in the first set of one or more nodes is to be taken offline:
determining that a first service of the plurality of services is to be provided by a first node of the multiple nodes;
determining that a second service of the plurality of services is to be provided by a second node, of the multiple nodes, that is different than the first node.

13. The one or more non-transitory storage media of claim 11, wherein the instructions, when executed by the one or more processors, further cause, in response to determining that each node in the first set of one or more nodes is to be taken offline:
moving one or more client connections from a node in the first set of one or more nodes to a node in the second set of one or more nodes.

14. The one or more non-transitory storage media of claim 11, wherein the instructions, when executed by the one or more processors, further cause, after determining that each node in the first set of one or more nodes is to be taken offline and prior to performing the one or more maintenance operations:
sending, from a second node in the second set of one or more nodes, to a first node in the first set of one or more nodes, affinity data that identifies one or more database objects to which the second node is assigned;
in response to receiving the affinity data, preventing, at the first node, locks from being opened on any of the one or more database objects.

15. The one or more non-transitory storage media of claim 11, wherein the instructions, when executed by the one or more processors, further cause, after determining that each node in the first set of one or more nodes is to be taken offline and prior to performing the one or more maintenance operations:
for each node in the first set of one or more nodes:
causing modified buffers to be written to persistent storage, and
sending, to each node in the second set of one or more nodes, a notification that the modified buffers have been persistently stored.

16. The one or more non-transitory storage media of claim 11, wherein the instructions, when executed by the one or more processors, further cause, after determining that each node in the first set of one or more nodes is to be taken offline and prior to performing the one or more maintenance operations:
receiving, from a first node in the first set of one or more nodes, at a second node in the second set of one or more nodes, a lock request;
in response to receiving the lock request at the second node, determining, at the second node, to deny the lock request.

17. The one or more non-transitory storage media of claim 11, wherein the instructions, when executed by the one or more processors, further cause, after performing the one or more maintenance operations on each node in the first set of one or more nodes and prior to using the first data access management system in the node cluster:
identifying a third set of one or more nodes from the second set of one or more nodes;
performing the one or more maintenance operations on each node in the third set of one or more nodes.

18. The one or more non-transitory storage media of claim 11, wherein the instructions, when executed by the one or more processors, further cause:
   in response to determining that each node in the first set of one or more nodes is to be taken offline:
      designating each node in the first set of one or more nodes as a passive node, and
      designating each node in the second set of one or more nodes as an active node;
   after performing the one or more maintenance operations:
      for each node that is designated as an active node, converting one or more locks that are maintained by said each node from the second type to the first type.

19. The one or more non-transitory storage media of claim 11, wherein the instructions, when executed by the one or more processors, further cause:
   in response to determining that each node in the first set of one or more nodes is to be taken offline:
      designating each node in the first set of one or more nodes as a passive node, and
      designating each node in the second set of one or more nodes as an active node;
   after performing the one or more maintenance operations:
      for each node that is designated as an active node, sending one or more locks from said each node to a node that is designated as a passive node.

20. The one or more non-transitory storage media of claim 11, wherein the instructions, when executed by the one or more processors, further cause:
   in response to determining that each node in the first set of one or more nodes is to be taken offline:
      designating each node in the first set of one or more nodes as a passive node, and
      designating each node in the second set of one or more nodes as an active node;
   after performing the one or more maintenance operations:
      for each of one or more nodes that is designated as an active node, moving one or more client connections to a node that was most recently designated as a passive node upon which the one or more operations were performed.

\* \* \* \* \*